Apr. 24, 1923.
J. GRESZCZUK
AUTOMOBILE TIRE
Filed Nov. 25, 1921
1,453,224
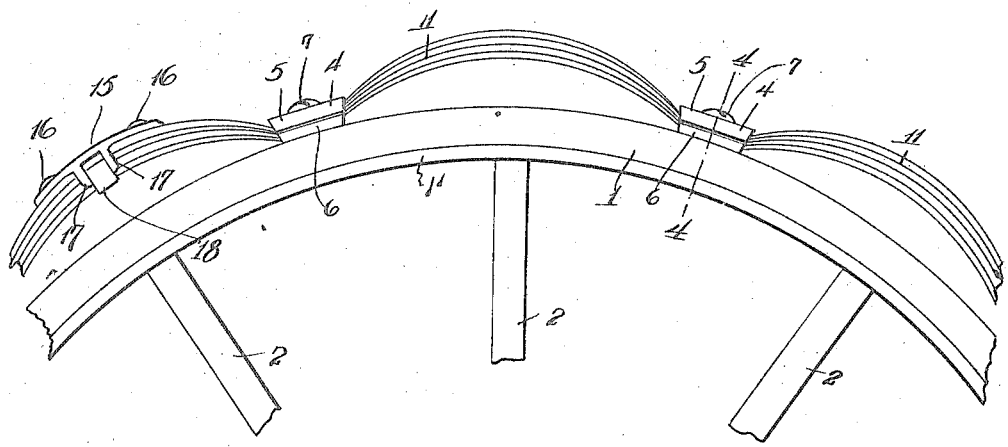
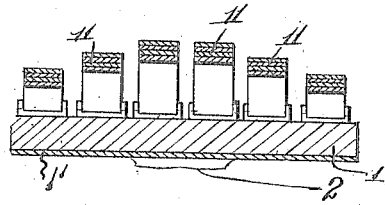
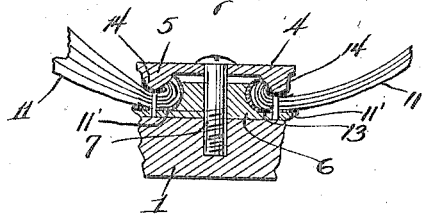
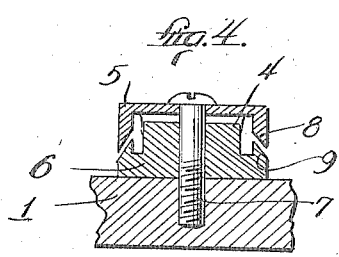
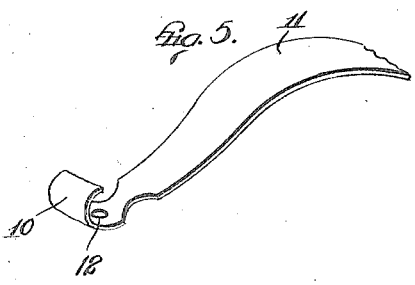
Inventor
Joseph Greszczuk Patented Apr. 24, 1923.

1,453,224

UNITED STATES PATENT OFFICE.

JOSEPH GRESZCZUK, OF BROOKLYN, NEW YORK.

AUTOMOBILE TIRE.

Application filed November 25, 1921. Serial No. 517,540.

*To all whom it may concern:*

Be it known that I, JOSEPH GRESZCZUK, a subject of Poland, residing at Brooklyn, in the county of Kings and State of New York, have invented certain new and useful Improvements in Automobile Tires, of which the following is a specification.

This invention relates to resilient tires for automobiles and more particularly to an improved spring tire especially adapted for use on automobiles.

The primary object of the invention is to provide a spring tire which will include a plurality of springs arranged in a manner which will give the desired resiliency to the wheel without the use of pneumatic tires.

One of the objects of the invention is also to provide a resilient tire having laterally spaced and circumferentially spaced springs constructed in a manner which will absorb the shock occasioned by the wheel traveling over a roadway when the automobile is in motion.

Other objects of the invention will appear upon the consideration of the following detail description and accompanying drawings, wherein:

Figure 1 is a fragmentary side elevation of a portion of a tire constructed in accordance with my invention.

Figure 2 is a transverse cross section illustrating the graduating springs extending laterally across the wheel rim.

Figure 3 is a longitudinal section through the clip element employed for connecting the spring elements together.

Figure 4 is a cross section taken on the line 4—4 of Fig. 1, and

Figure 5 is a fragmentary perspective view of one of the spring elements.

Referring to the drawing by numerals, the wheel rim 1 is preferably constructed of metal and is mounted upon the felly 1' of the wheel supported by the spokes 2. Circumferentially spaced around the circular rim 1 is a plurality of retaining clips 4 which consist of complementary gripping members 5 and 6 provided with openings to receive fastening bolts 7 which are screw threadedly mounted in the rim 1. The side edges of the clip elements 5 and 6 are beveled as indicated at 8 and 9 so that they may be properly fitted together and the opposite end portions are constructed to receive the curved ends 10 of the semi-elliptical springs 11. The springs 11 are arranged in groups around the rim as shown in Figs. 1 and 2 of the drawing, in the present instance, four leaves 11 being provided to constitute a single group or spring element. The rigid clip member 6 of the fastening structure is provided at opposite sides with curved recesses which receive the curved ends 10 when the springs are assembled together and these curved ends are provided with openings 12 to receive pins 13 whereby the ends of the springs will be properly held in associated relation. The movable clip members 5 are each provided at their ends with gripping lugs 14 which are adapted to be lodged in the curved portions of the springs at the ends as indicated in Fig. 3 thus binding the springs in position between the clips 5 and 6. Arranged above and below the ends of the springs are strips of leather 11' which prevent frictional contact between the springs and clip members. In this manner the ends of the springs are held to the rim of the wheel so that the intermediate portions of the springs will be in a position to offer the proper spring when the wheel is in use.

As shown in Figure 2, the springs are graduated transversely so that an arcuate tread surface is provided for the tire at the point where the tire engages the ground, the outermost springs being considerably lower than the centermost springs.

Additional tread members may be provided on the springs if thought desirable, one of these being illustrated in Fig. 1 at 15. This tread member is secured by the fastening elements 16 to the outermost leaf of the spring and its central portion is provided with fingers 17 overlapping the opposite sides of the leaves of the spring and adapted to engage lugs 18 on the lowermost leaf of the spring so that a rigid hold is obtained by the tread member so that it will act as a wearing plate at the point where the spring member engages the ground surface. Obviously other modifications of this tread member may be mounted upon the spring if desired.

It will be understood that additional spring members and modifications in the manner of constructing the device may be employed upon different types of wheels as where the device is employed on heavy trucks and other vehicles.

Minor changes may be made in the details of construction without departing from the spirit of the invention or the scope of the claims hereunto appended.

What is claimed is:—

1. A spring wheel of the character described comprising in combination with a rim, a plurality of fastening cleats comprising complementary members adapted to be fastened together, the opposite ends of the cleats being opened, a plurality of leaves arranged in groups for forming a plurality of spring members, the leaves in each group being adapted to be extended into the open ends of the said fastening members whereby they may be engaged by the said cleats, the cleats having curved recesses, the ends of the springs being curved to fit the recesses, one member of each cleat being provided with lugs to engage the curved portions of the said leaves whereby they will be rigidly held between the cleats.

2. A spring wheel of the character described comprising in combination with a rim, a plurality of fastening cleats comprising complementary members adapted to be fastened together, the opposite ends of the cleats being opened, a plurality of leaves arranged in groups for forming a plurality of spring members, the leaves in each group being adapted to be extended into the open ends of the said fastening members whereby they may be engaged by the said cleats, the cleats having curved recesses, the ends of the springs being curved to fit the recesses, one member of each cleat being provided with lugs to engage the curved portions of the said leaves whereby they will be rigidly held between the cleats, the end of each leaf being provided with an opening, and pins extending through the openings whereby the said leaves will be held in assembled relation.

In testimony whereof, I have affixed my signature in the presence of two witnesses.

JOSEPH GRESZCZUK.

Witnesses:
 Moses Zanger,
 M. Skrynkowitz.